April 7, 1959 P. GORES 2,881,278
ELECTRICAL SWITCH AND CONTROL MECHANISM
Filed July 1, 1957
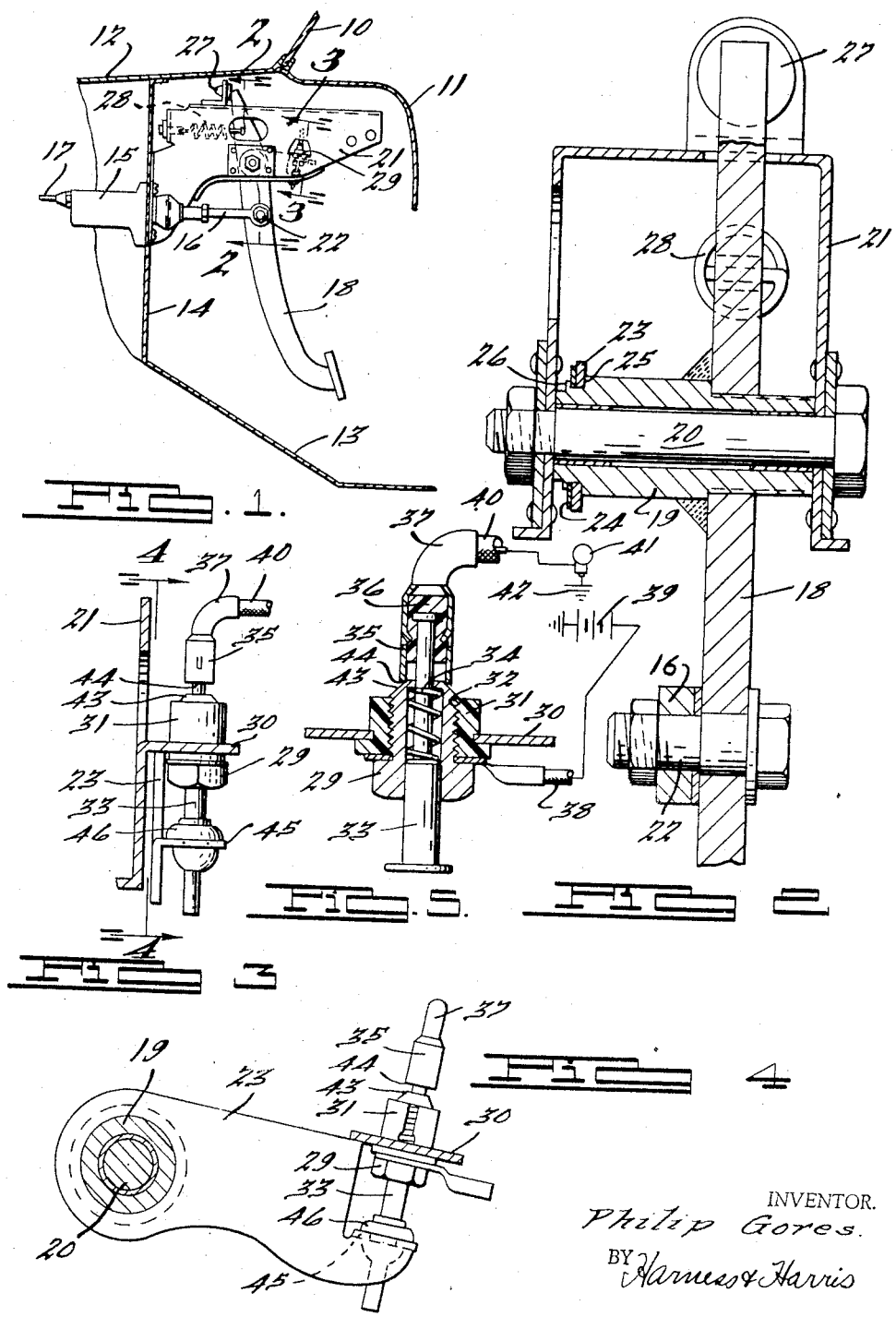
INVENTOR.
Philip Gores.
BY Harness & Harris
ATTORNEYS.

United States Patent Office 2,881,278
Patented Apr. 7, 1959

2,881,278

ELECTRICAL SWITCH AND CONTROL MECHANISM

Philip Gores, Detroit, Mich., assignor to Chrysler Corporation, Highland Park, Mich., a corporation of Delaware Application July 1, 1957, Serial No. 669,110

9 Claims. (Cl. 200—61.89)

This invention relates to improvements for controlling the operation of an electric switch.

An object of the invention is to provide for improvements in the operation of a mechanical electric switch for controlling an electric signal, for example a stop light, in timed relation with the operation of a braking system for a motor vehicle.

Another object of the invention is the provision of switch operating and control mechanism which can be readily adjusted to insure the desired opening and closing of the switch in timed relation with the operation of a mechanical mechanism, for example the braking system of a motor vehicle.

A still further object of the invention is to provide a switch control which includes a prime mover, movable between a normally at rest position and an operating position and a motion transmitting member having a friction drive connection therewith for moving this member in unison with the prime mover, the friction drive connection yielding to accommodate adjustment of the motion transmitting member relative to the prime mover to insure opening and closing of the switch at the respective desired positions of the prime mover; and to provide an abutment coacting with the motion transmitting member to predetermine its switch operating position when the prime mover is disposed in one of its positions.

Other objects and advantages of the invention will be more apparent from the following description taken in connection with the accompanying drawings, in which:

Fig. 1 is a fragmentary elevational view, partly in section, showing the invention as embodied in a vehicle brake operating mechanism;

Fig. 2 is an enlarged sectional view taken as indicated by the line 2—2 of Fig. 1;

Fig. 3 is an enlarged side elevational view taken on line 3—3 of Fig. 1;

Fig. 4 is a side elevational view, partly in section, taken as indicated by the line 4—4 of Fig. 3; and Fig. 5 is an enlarged view, mainly in section, similar to Fig. 3 but showing the switch in its closed position and the outline of my electrical circuit including the switch and an electrical signal.

The invention is illustrated and described in conjunction with the brake mechanism for a motor vehicle although it will be understood that the invention is not limited to such embodiment and can be used in other mechanisms. For a number of years motor vehicles have been equipped with a signal, generally in the form of an electric stop light, which is operated in timed relation with the operation of the brake mechanism to serve as an indication that the vehicle is to be brought to a stop.

In the drawings only those portions of the vehicle and of the braking system therefor necessary to an understanding of the application of the invention are shown. The vehicle includes a windshield 10, an instrument panel 11, a hood 12 for the engine compartment, a floor and toe board 13, and a wall 14 between the engine and passenger compartments. A conventional master cylinder 15 is mounted on wall 14 and includes the usual piston, not shown, which is actuated by a rod 16 to displace fluid from the cylinder under pressure through a line 17 to the wheel brake cylinders, not shown. The rod 16 is operated by a pedal structure including a pedal 18 serrated on and welded to a hub 19 which is journalled on a pivot pin 20 carried by a channel-shaped bracket 21 mounted on the wall 14, the rod 16 being bolted at at 22 to the pedal.

An arm 23 extends angularly from the hub 19 and has a friction driving connection therewith through a Belleville type spring washer 24. In this connection the arm abuts a shoulder 25 of hub 19 and the washer 24 is held under compression against arm 23 by staking as shown at 26. The friction driving connection will accommodate forced rotation of the arm 23 relative to the pedal structure hub 19 for the purposes hereafter set forth. As shown, the pedal 18 and arm 23 are in the brake released position and the pedal is engaged with a stop 27 under influence of a spring 28.

A switch mechanism, generally indicated at 29, is utilized to control operation of an electrical signal, for example a stop light, in timed relation with operation of the braking system of a motor vehicle. The switch mechanism is mounted on a flange 30 integral with and deflected relative to one of the side members of the support 21. The flange 30 has an opening in which is mounted an electrically insulating bushing 31, the latter being split to permit contraction for insertion into the opening and expansion for retention therein, as shown in Fig. 5.

The inner surface of the bushing 31 is threaded to receive the stationary part 32 of the switch mechanism, the threaded engagement tending to expand the bushing 31 radially. A plunger 33 is slidably mounted in the stationary part 32 and is urged into a position to close the switch, as shown in Fig. 5, by a spring 34. The plunger carries a cylinder part 35 electrically insulated therefrom by a bushing 36, and the part 35 carries an electrical conductor connection 37.

The electrical circuit includes a lead in conductor 38 connected with a storage battery 39, the stationary part 32, cylindrical part 35, conductor connector 37, conductor 40, light 41 and ground 42. The end face 43 of stationary part 32 and the adjacent end 44 of part 35 provide the switch contacts which are moved into and out of engagement in response to movement of plunger 33 between its Fig. 3 and Fig. 5 positions.

The switch mechanism is controlled by the pedal 18, arm 23 and spring 34 acting on plunger 33. When the pedal 18 is in its neutral or brake release position, as shown in Fig. 1, the arm 23 is rotatably positioned relative to the pedal to engage the top surface of arm 23 with the flange 30 and an abutment 45 integral with arm 23 acting on the end of plunger 33 has moved the latter to the Fig. 3 and Fig. 4 positions wherein the electrical contacts 43, 44 are relatively separated, the plunger 33 being insulated soundwise from the abutment 45 by a body of suitable material 46. The relative spacing of the top, abutment forming surface of arm 23 and abutment 45 is predetermined to insure separation of contacts 43, 44 when pedal 18 is in its brake release position. If due to discrepancies and tolerances in the mounting structure of the brake mechanism the arm 23 is not initially positioned as shown in Fig. 4 when the pedal is in brake release position, the arm 23 can be forcibly rotated relative to the pedal structure by the yielding of the friction connection between the arm and pedal structure to position the arm as shown in Fig. 4.

In operation of the foregoing mechanism, when the pedal 18 is moved clockwise, as viewed in Fig. 1 to apply the brakes, the arm moves in a clockwise direction, as viewed in Fig. 4, and its abutting surfaces are likewise moved, permitting the spring 34 to move the plunger 33 to its Fig. 5 position wherein the contacts 43, 44 are engaged and the circuit for the light signal is closed, and a warning is given that the vehicle will be brought to a stop. In the return movement of the pedal to its neutral position the abutment 45 acts on plunger 33 to move it from the Fig. 5 position to the position of Figs. 3 and 4, thus separating contacts 43, 44, and arm 23 again engages its abutment forming flange 30.

I claim:

1. In combination, a switch including a fixed member having a first electrical contact element and including a shiftable member having a second electrical contact element engageable with said first contact element, means for moving said shiftable member relative to said fixed member to bring said contact elements into and out of engagement with each other respectively, said means including a manually operable lever and a switch actuating arm movable by and shiftable relative to said lever, drive transmitting means coacting between said lever and said arm for normally yieldably driving said arm in unison with said lever, and means interacting between said drive transmitting means and said arm accommodating manual relative adjustment of said lever and arm to insure engagement and disengagement of said contact elements at respective desired positions of said lever.

2. In combination, a switch including a fixed member having a first electrical contact element and including a shiftable member having a second electrical contact element engageable with said first contact element, means for moving said shiftable member relative to said fixed member to bring said contact elements into and out of engagement with each other respectively, said means including a manually operable lever and a switch actuating arm movable by and shiftable relative to said lever, and drive transmitting means coacting between said lever and said arm for normally yieldably driving said arm in unison with said lever, said drive transmitting means accommodating manual relative adjustment of said lever and arm to insure engagement and disengagement of said contact elements at respective desired positions of said lever, said arm having relatively spaced fixed abutment surfaces one thereof engageable with said fixed member to limit movement of said arm in one direction and the other of said abutment surfaces maintaining said shiftable member in a position to separate said electrical contact elements when said one abutment surface is engaged with said fixed member.

3. In combination, a switch mechanism including relatively movable electrical contacts, a plunger carrying one of said contacts and movable in opposite directions to respectively engage and disengage said contacts, a spring biasing said plunger in a direction to engage said contacts, a pedal mounted for swinging movement, and an arm connected with said pedal for swinging movement therewith and operable when moved in one direction to move said plunger, against the resistance of said spring, in a direction to disengage said contacts and said arm being operable when moved in another direction to accommodate movement of said plunger by said spring in a direction to engage said contacts, the connection between said arm and pedal including friction means accommodating forced rotation of said arm relative to said pedal in a direction to adjustably position said arm relative to said plunger.

4. In combination, a switch mechanism including relatively movable electrical contacts, a plunger carrying one of said contacts and movable in opposite directions to respectively engage and disengage said contacts, a spring biasing said plunger in a direction to engage said contacts, a pedal mounted for swinging movement, and an arm connected with said pedal for swinging movement therewith and operable when moved in one direction to move said plunger, against the resistance of said spring, in a direction to disengage said contacts and said arm being operable when moved in another direction to accommodate movement of said plunger by said spring in a direction to engage said contacts, the connection between said arm and pedal including friction means accommodating forced rotation of said arm relative to said pedal in a direction to adjustably position said arm relative to said plunger, an abutment engaged by said arm in response to said forced rotation of said arm and operable when so engaged to predetermine the adjusted position of said arm relative to said plunger.

5. In combination, a switch mechanism including relatively movable contacts, a plunger movable between first and second positions to respectively engage and disengage said contacts, means controlling movement of said plunger between its said positions including an operating member movable between a normally stationary position and an operating position, a motion transmitting member between said operating member and said plunger, an abutment engageable by said motion transmitting member to predetermine the operating position of said motion transmitting member relative to said plunger when said operating member is in one of its said positions, and a motion transmitting friction connection between said members yieldable to accommodate manual movement of said motion transmitting member relative to the operating member to position said motion transmitting member for engagement with said abutment when the operating member is in its said one position.

6. In combination, a switch mechanism including relatively movable electrical contacts, a plunger movable between first and second positions wherein said contacts are respectively engaged and disengaged, an abutment, and operating means for said plunger including a plurality of interconnected members one of said members being movable in one direction to engage said abutment and to move said plunger from one of its said positions to the other thereof, and a friction connection between said one member and another of said members accommodating relative movement therebetween whereby said one member is adjustably positioned relative to said abutment and to said plunger.

7. In the combination of a vehicle braking system and an electrically energized signal for indicating operation of the braking system, a lever movable from a normally stationary first position to a second position to actuate the braking system, a switch mechanism controlling energization of the signal and having relatively movable contacts, a plunger movable in opposite directions to respectively engage and disengage said contacts, a spring biasing said plunger in a direction to engage said contacts in response to movement of said lever from its first position to its second position, an arm having a motion transmitting friction connection with said lever for movement therewith and operating on said plunger to move it in a direction to disengage said contacts during movement of the lever from its second position to its first position, said motion transmitting friction connection yielding to accommodate forced manual movement of said arm relative to said lever whereby the operating position of said arm is adjustably positioned relative to said plunger.

8. In combination, a vehicle including an electrical power source, an electrical device, a switch having a fixed contact and a movable contact, circuit means connecting said contacts, said source and said electrical device electrically in series so that separatiton of said contacts causes de-energization of said device, biasing means carried by said switch urging said contacts into engagement, a braking system including a manually operable lever movable between first and second positions, and a switch actuating arm movable with said lever and operably connected to said movable contact, movement of said lever and arm from said first position to said second position accommodating engagement of said contacts in response to said biasing means and movement of said lever and arm from said second position to said first position accommodating separation of said contacts against the force of said biasing means.

9. In combination, a vehicle including an electrical power source, an electrical device, a switch having a fixed contact and a movable contact, circuit means connecting said contacts, said source and said electrical device electrically in series so that separation of said contacts causes de-energization of said device, biasing means carried by said switch urging said contacts into engagement, a braking system including a manually operable lever movable between first and second positions, and a switch actuating arm having a motion transmitting friction connection with said lever and operably connected to said movable contact, movement of said lever and arm from said first position to said second position accommodating engagement of said contacts in response to said biasing means and movement of said lever and arm from said second position to said first position accommodating separation of said contacts against the force of said biasing means, said motion transmitting friction connection yielding to accommodate forced manual movement of said arm relative to said lever whereby said arm is adjustably positioned relative to said movable contact.

References Cited in the file of this patent
UNITED STATES PATENTS 2,585,206    Zentecki _____ Feb. 12, 1952